United States Patent [19]

Wong

[11] Patent Number: 4,710,006
[45] Date of Patent: Dec. 1, 1987

[54] SHUTTER RELEASE AND FILM ADVANCE INTERLOCK MECHANISM

[75] Inventor: Wai C. Wong, Quarry Bay, Hong Kong

[73] Assignee: Eastman Kodak Company, Rochester, N.Y.

[21] Appl. No.: 46,767

[22] Filed: May 7, 1987

[51] Int. Cl.⁴ ............................................. G03B 17/42
[52] U.S. Cl. ..................................................... 354/204
[58] Field of Search .............. 354/204, 205, 206, 212, 354/213, 207

[56] References Cited

U.S. PATENT DOCUMENTS

| | | | |
|---|---|---|---|
| 3,577,900 | 5/1971 | Pickering et al. | 354/207 |
| 3,829,874 | 8/1974 | Morino | 354/204 |
| 3,906,530 | 9/1975 | Oshima | 354/206 |
| 4,193,678 | 3/1980 | In Son | 354/204 |
| 4,595,269 | 6/1986 | Wong | 354/204 |

Primary Examiner—L. T. Hix
Assistant Examiner—Brian W. Brown
Attorney, Agent, or Firm—Roger A. Fields

[57] ABSTRACT

A camera is provided wherein accidental manual rotation of a thumbwheel to advance film in the camera is prevented whenever the shutter is opened to take a picture. According to the invention, when a trigger button is manually depressed, a high energy member in a cocked position is unlatched to permit the high energy member to travel a first increment to momentarily open the shutter. The film advance thumbwheel remains locked by a locking member to prevent any rotation of the thumbwheel. When the trigger button is manually released to return to its original position, the trigger button disengages from the high energy member, permitting the high energy member to travel a second increment. During its second increment of travel, the high energy member moves the locking member out of locking relation with the thumbwheel. Thus the thumbwheel cannot be operated to advance film until picture-taking is completed.

5 Claims, 7 Drawing Figures

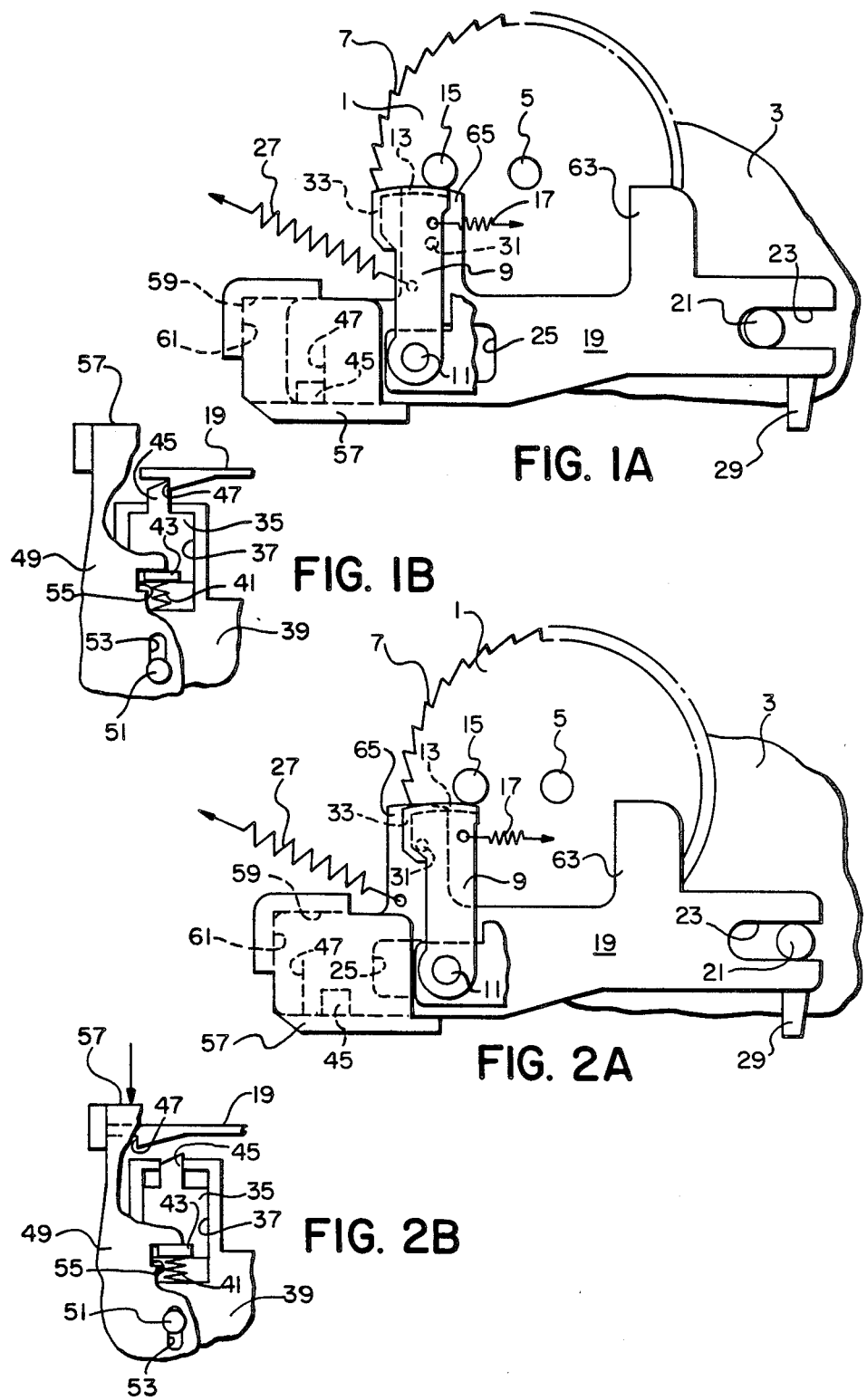

SHUTTER RELEASE AND FILM ADVANCE INTERLOCK MECHANISM

CROSS-REFERENCE TO A RELATED PATENT

U.S. Pat. No. 4,595,269, entitled CAMERA DOUBLE EXPOSURE PREVENTION SYSTEM and granted June 17, 1986 in the name of Wai C. Wong, is incorporated into this application by reference.

BACKGROUND OF THE INVENTION

1. Field of the Invention

The invention relates generally to the field of photographic cameras and in particular to a camera wherein accidental manual operation of the film advance means is prevented when the shutter is opened to take a picture.

2. Description of the Prior Art

U.S. Pat. No. 4,595,269, referenced above, discloses a relatively inexpensive camera in which a thumbwheel is manually rotated to advance film substantially a frame width to position a fresh frame for exposure. The thumbwheel is intended to be rotated following each time a single-blade shutter is pivoted open and closed to take a picture. When the photographer depresses a trigger button to actuate the shutter, the thumbwheel is free to rotate. Consequently, it is possible for the photographer to accidentally rotate the thumbwheel while the shutter is open. This will cause the frame in the exposure position to be moved during picture-taking, thereby resulting in a blurred picture.

SUMMARY OF THE INVENTION

The invention improves the camera disclosed in U.S. Pat. No. 4,595,269 by preventing accidental manual rotation of the film advance thumbwheel whenever the shutter is opened to take a picture.

According to the invention, when a trigger button is manually depressed, a high energy member in a cocked position is unlatched to permit the high energy member to travel a first increment to momentarily open the shutter. The film advance thumbwheel remains locked by a locking member to prevent any rotation of the thumbwheel. When the trigger button is manually released to return to its original position, the trigger button disengages from the high energy member, permitting the high energy member to travel a second increment. During its second increment of travel, the high energy member moves the locking member out of locking relation with the thumbwheel. Thus the thumbwheel cannot be rotated to advance film until picture-taking is completed.

BRIEF DESCRIPTION OF THE DRAWINGS

The invention will be described in connection with the drawings, wherein:

FIG. 1A is a plan view of a shutter release and film advance interlock mechanism in accordance with a preferred embodiment of the invention, showing a high energy member in a cocked position and a locking member in a locking position;

FIG. 1B is a partial cut-away elevation view of a trigger member in an original position;

FIG. 2A is a view similar to FIG. 1A, showing the high energy member having completed a first increment of travel and the locking member remaining in its locking position;

FIG. 2B is a view similar to FIG. 1B, showing the trigger member manually depressed;

DESCRIPTION OF THE PREFERRED EMBODIMENT

Figure 3A:
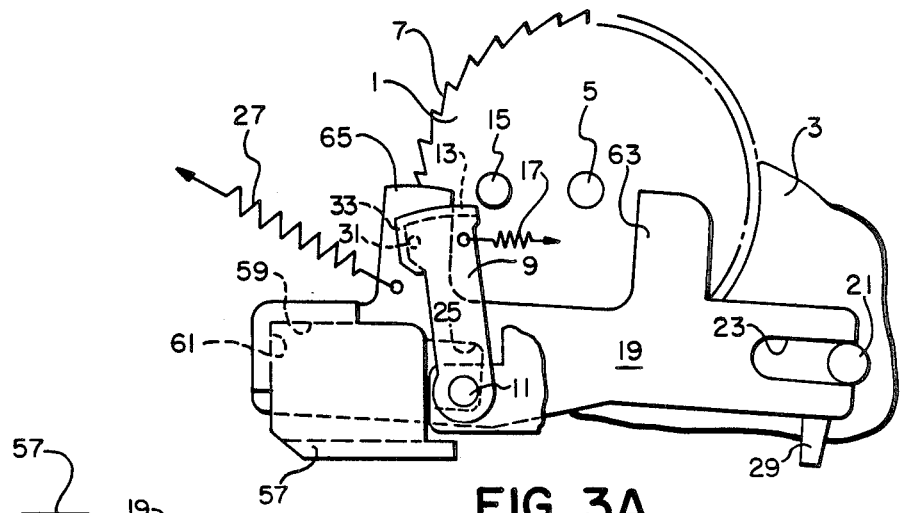
FIG. 3A is a view similar to FIG. 1A, showing the high energy member having completed a second increment of travel and the locking member changed to a non-locking position.

The invention is described as being embodied preferably in a 35 mm camera, such as the one disclosed in U.S. Pat. No. 4,595,269 incorporated herein by reference. Because the general features of a 35 mm camera are well known, the description which follows is directed in particular to photographic elements forming part of or cooperating directly with the disclosed embodiment. It is understood, however, that other elements not specifically shown or described may take various forms known to persons of ordinary skill in the art.

Referring now to the drawings and in particular to FIG. 1A, there is shown a shutter release and film advance interlock mechanism according to a preferred embodiment of the invention. A film advance thumbwheel 1 is mounted on a subplate 3 of the camera frame by a pin 5 for manual rotation in a counter-clockwise direction. The thumbwheel 1 is rotated to rotate a film engaging sprocket (not shown) and to drive a film take-up spool (not shown) via intermediate gearing (not shown), typically through an associated friction clutch (not shown), to advance a 35 mm filmstrip to position its successive frames for exposure following each time a shutter blade (not shown) is momentarily flipped open and closed to take a picture. Details of the shutter blade are disclosed in U.S. Pat. No. 4,595,269. An anti back-up pawl (not shown) is positioned in engagement with successive teeth 7 on the thumbwheel 1 to prevent manual rotation of the thumbwheel in a clockwise direction as viewed in FIG. 1A.

Figure 4:
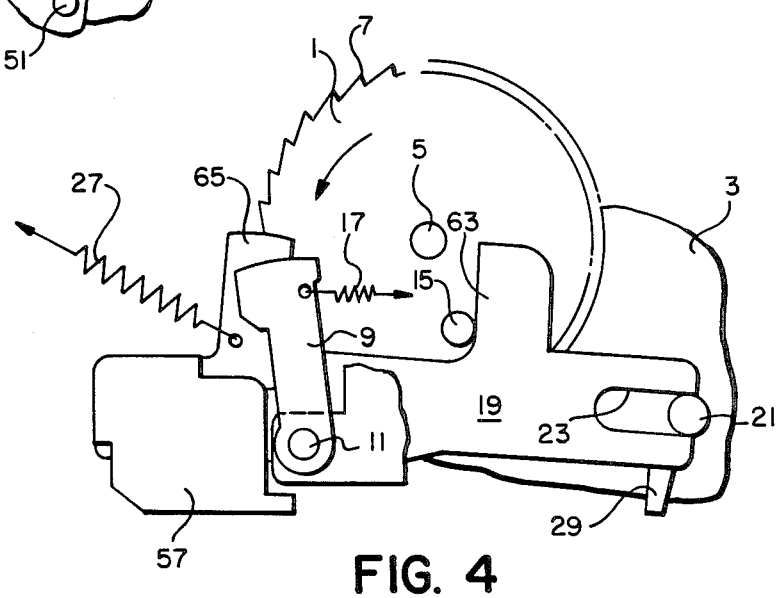
FIG. 4 is a view similar to FIG. 1A, showing rotation of a film advance thumbwheel to return the high energy member to its cocked position.

A locking member 9 is mounted on the subplate 3 by a pin 11 for pivotal movement in opposite directions between a locking position, shown in FIGS. 1A and 2A, and a non-locking position, shown in FIGS. 3A and 4. In the locking position, the locking member 9 is disposed with a lip portion 13 in abutment against a stud 15 on the thumbwheel 1 to prevent manual rotation of the thumbwheel in the counter-clockwise direction as viewed in FIG. 1A. In the non-locking position, the locking member 9 is disposed with its lip portion 13 removed from the stud 15 to permit manual rotation of the thumbwheel 1 in the counter-clockwise direction. The locking member 9 is biased to its locking position against a suitable stop (not shown) by a return spring 17.

A high energy slider 19 is mounted on the subplate 3 for general left and right movement, the slider being guided in this movement at its right end by a pin 21 fixed to the subplate and extending into a close-fitting slot 23 in the slider. See FIG. 1A. Similarly, proximate to the left end of the slider 19, the pin 11 (on which the locking member 9 is mounted) controls the right end of the slider by extending through an aperture 25 of the slider. The aperture 25 is elongated in the same direction as is the slot 23, but further is elongated in a transverse direction to allow the slider 19 to be rotated a modest degree clockwise about the pin 21 as viewed in FIG. 3A, for reasons that will shortly become apparent. The slider 19 is urged to the left by an actuating spring 27 from a cocked position, shown in FIG. 1A, for first and second increments of travel. During its first increment of travel, shown in FIG. 2A, the slider 19 moves to the left to cause an integral striker 29 to strike the shutter blade, to momentarily flip open the shutter blade. A return spring (not shown) closes the shutter blade. During its second increment of travel, shown in FIG. 3A, the slider 19 moves further to the left and, in addition, it rotates slightly clockwise about the pin 21 to cause an integral stud 31 to push against a lip portion 33 of the locking member 9 to pivot the locking member from its locking position to its non-locking position against the opposite force of the return spring 17. Thus the thumbwheel 1 can then be manually rotated in the counter-clockwise direction as shown in FIG. 4.

The slider 19 is secured in its cocked position by a latch member 35 slidably mounted for vertical movement in a recess 37 in a subwall 39 of the camera housing. See FIG. 1B. The latch member 35 is urged upward by a return spring 41 compressingly engaging the lower surface of an outwardly extending foot portion 43 of the latch member. A latching tooth 45 of the latch member 35 is urged by the return spring 41 to engage the slider 19 at a notch 47 in the slider to releasably retain the slider in its cocked position against the pulling force of the actuating spring 27.

A manually depressible trigger 49 is mounted on the subwall 39 for vertical movement, the trigger being guided in this movement by a pin 51 fixed to the subwall and extending into a close-fitting aperture 53 in the trigger. A second aperture 55 in the trigger 49 is arranged to loosely encircle the foot portion 43 of the latch member 35. When a button portion 57 of the trigger 49 is manually depressed as shown in FIG. 2B, the trigger engages the foot portion 43 at the aperture 55 to lower the latch member 35 until its latching tooth 45 is removed from the notch 47 in the slider 19, thereby releasing the slider for movement by the actuating spring 27 to the left its first increment of travel from its cocked position. See FIG. 2A. As long as the button portion 57 of the trigger 49 is manually depressed, a channel 59 in the underside of the button portion constrains the left end of the slider 19 to prevent the slider from being rotated by the actuating spring 27 slightly clockwise about the pin 21. Also, an end wall 61 of the channel 59 prevents movement of the slider 19 beyond its first increment of travel by the actuating spring 27. Thus, although the shutter has been momentarily opened by the striker 29, the locking member 9 will retain the thumbwheel 1 in place as shown in FIG. 2A.

Figure 3B:
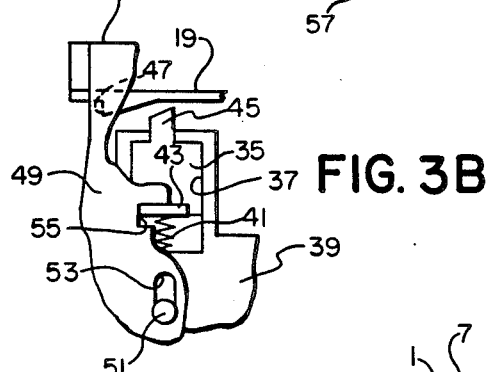
FIG. 3B is a view similar to FIG. 1B, showing the trigger member returned to its original position.

When the button portion 57 of the trigger 49 is manually released as shown in FIG. 3B, a return spring (not shown) raises the trigger to its original position, removing the channel 59 from the left end of the slider 19. This allows the actuating spring 27 to move the slider 19 its second increment of travel (including the rotation slightly clockwise about the pin 21) as shown in FIG. 3A, thereby pivoting the locking member 9 from its locking position to its non-locking position. As shown in FIG. 4, rotation of the thumbwheel 1 in the counterclockwise direction is then possible. Rotation of the thumbwheel 1 first moves the stud 15 on the thumbwheel against an extension 63 of the slider 19 to push the slider to the right almost back to its cocked position and then moves the stud against an extension 65 of the slider to rotate the slider slightly counter-clockwise exactly back to its cocked position. Simultaneously, the return spring 17 moves the locking member 9 back to its locking position.

The invention has been described with reference to a preferred embodiment. However, it will be appreciated that variations and modifications can be effected within the ordinary skill in the art without departing from scope of the invention. For example, instead of the thumbwheel 1 other manually operable film advance means, such as a slider or a lever, may be employed.

I claim:

1. An improved camera of the type wherein a shutter is opened to take a picture and film advance means is manually operable, and wherein the improvement comprises:

locking means movable between a locking position for preventing manual operation of said film advance means and a non-locking position for permitting manual operation of the film advance means;

actuating means movable from a cocked position a first increment of travel for opening said shutter and a second increment of travel for moving said locking means to its non-locking position; and manually operable trigger means movable from an original position in which said trigger means engages said actuating means in its cocked position to a taking position for first disengaging said actuating means in its cocked position to permit the actuating means to move its first increment of travel and for then re-engaging said actuating means when the actuating means completes its first increment of travel, and movable back to its original position for again disengaging said actuating means to permit the actuating means to move its second increment of travel, whereby said film advance means is prevented from being manually operated when said shutter is opened.

2. The improvement as recited in claim 1, wherein said film advance means includes a thumbwheel manually rotatable in a predetermined direction to advance film in said camera, and said locking means when in its locking position is positioned to block rotation of said thumbwheel in the predetermined direction and when in its non-locking position is positioned to permit rotation of the thumbwheel in the predetermined direction.

3. The improvement as recited in claim 2, wherein said locking means is mounted for pivotal movement between its locking and non-locking positions, and said actuating means when moved its second increment of travel pivots said locking means from its locking to its non-locking position.

4. The improvement as recited in claim 1, wherein said locking means is spring urged to move from its non-locking position to its locking position, and said actuating means is spring urged to move from its cocked position the first and second increments of travel and when having completed its second increment of travel is spring urged to hold said locking means in its non-locking position.

5. The improvement as recited in claim 4, wherein said film advance means includes a thumbwheel manually rotatable in a predetermined direction to advance film in said camera, said locking means when in its locking position is positioned to block rotation of said thumbwheel in the predetermined direction and when in its non-locking position is positioned to permit rotation of the thumbwheel in the predetermined direction, and said actuating means when having completed its second increment of travel is positioned for movement by said thumbwheel back to its cocked position to permit said locking means to be spring urged back to its locking position to stop rotation of the thumbwheel.

* * * * *